Aug. 18, 1931.         C. S. RICKER         1,819,690
HEAD LAMP CONTROL
Filed April 26, 1929         2 Sheets-Sheet 1
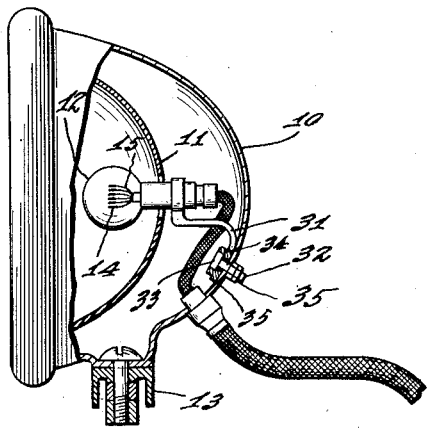
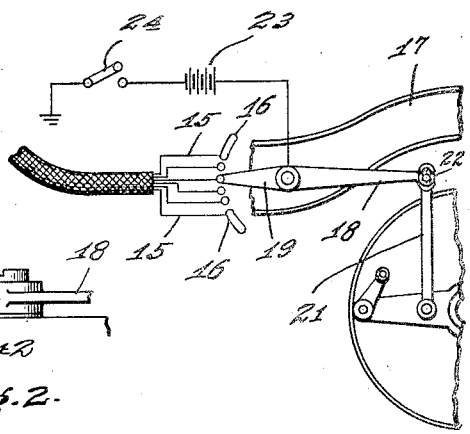
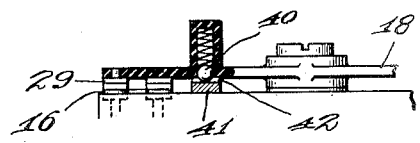
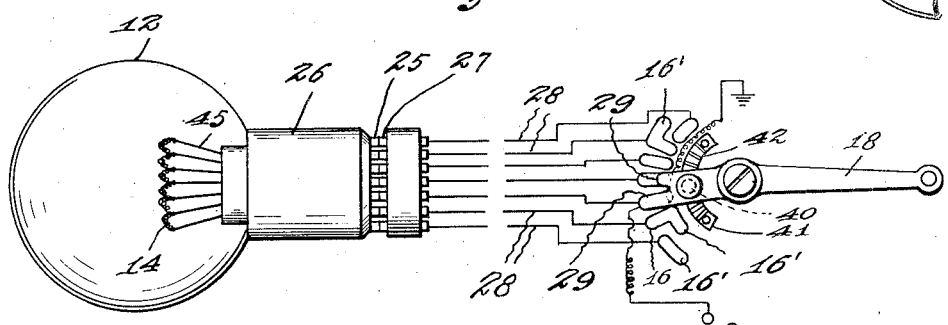
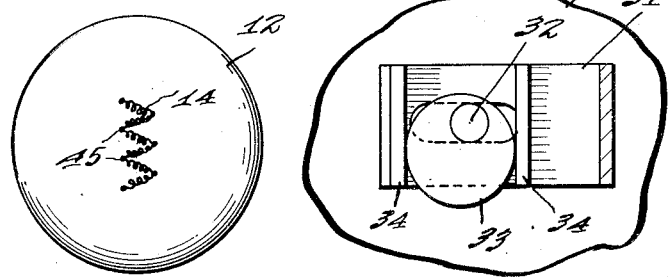
Inventor
CHESTER S. RICKER,
By
Attorneys

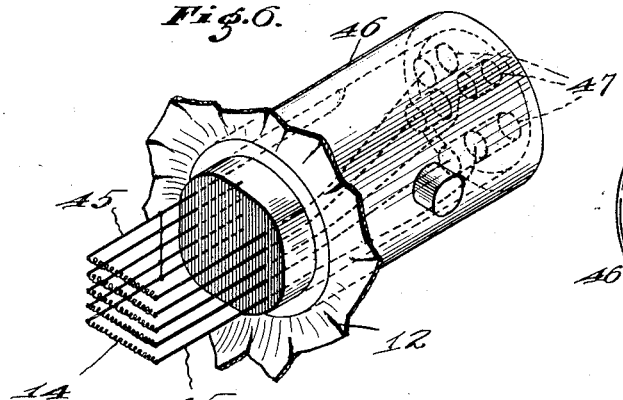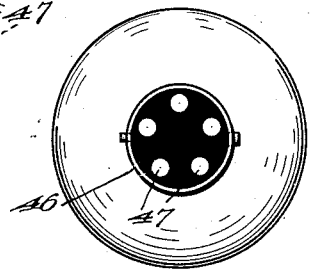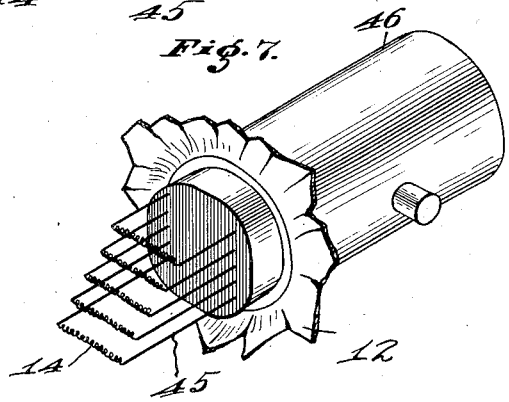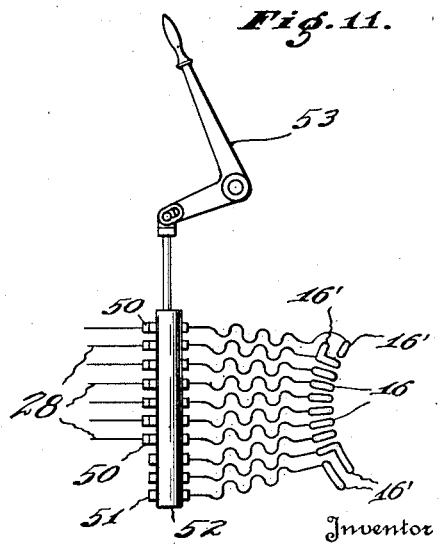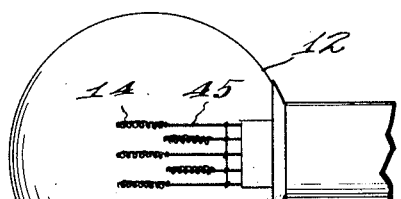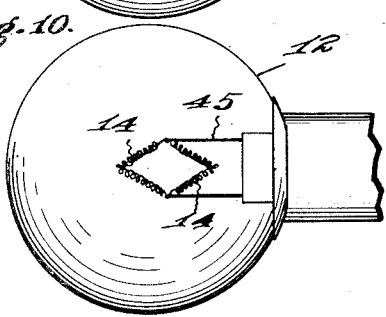

Patented Aug. 18, 1931

1,819,690

UNITED STATES PATENT OFFICE

CHESTER S. RICKER, OF WAUKESHA, WISCONSIN

HEAD LAMP CONTROL

Application filed April 26, 1929. Serial No. 358,212.

My invention is concerned with an automatic control for the headlight beam of an automobile, and it is my object to provide mechanism by which the position of a headlight beam on the road surface may be maintained substantially constant in spite of variations in the deflection of the springs which support the automobile frame from the axles.

In many automobiles as now manufactured, the springs are so "soft" that variations in the load carried by the automobile effect a marked vertical displacement of the headlight beam. In many automobiles, if the headlights are adjusted to provide sufficient road illumination and to prevent glare in the eyes of oncoming drivers when the automobile has a single occupant, the headlight beam, when the automobile is fully loaded, will be elevated to such an extent that inadequate illumination of the roadway is caused and objectionable glare in the eyes of oncoming drivers results. As indicated above, it is my object to control the beam emitted by the headlights of an automobile in such a manner that satisfactory illumination of the road will automatically be provided irrespective of variations in the loading of the automobile.

There are several ways in which my object can be accomplished. I may employ in the head lamps a conventional form of lamp bulb, and may move the lamp bulb vertically relative to the reflector or may tilt the reflector and lamp bulb together under automatic control, as shown in my co-pending application Serial No. 358,211, filed April 26, 1929; or, as shown in this application, I may employ a particular form of lamp bulb having a plurality of vertically spaced filaments, the disposition of the headlight beam depending upon which filament is supplied with current, and I may provide automatic means controlled by spring deflection for supplying current to that filament which will give the desired beam pattern on the road surface.

The accompanying drawings illustrates my invention: Fig. 1 is a somewhat diagrammatic view illustrating one embodiment of my invention and showing an automobile headlamp with parts thereof broken away to show the interior construction; Fig. 2 is a similar diagrammatic view illustrating a different arrangement of the filament connections and showing a slightly different form of control means; Fig. 3 is a front elevation of the lamp bulb shown in side elevation in Fig. 2; Fig. 4 is a detail view showing a convenient adjustable bracket for supporting the lamp bulb within the lamp housing; Fig. 5 is a side elevation in partial section showing details of the switch construction illustrated in Fig. 2; Figs. 6 and 7 are perspective views of two lamp bulbs with the bulb itself broken away showing convenient filament arrangements; Fig. 8 is a rear end elevation of lamp bulbs such as are shown in Figs. 6 and 7; Figs. 9 and 10 are a side elevation and a plan respectively of a lamp bulb showing a different filament arrangement; and Fig. 11 illustrates a manually-operable device for modifying the control effected by the switch mechanism.

The headlamp which I employ may be of any desired form, that shown in the drawings embodying a casing 10, a reflector 11, and a lamp bulb 12. The lamp casing may be mounted in any convenient manner from a suitable support 13, the support shown in the drawings being of a character providing only horizontal adjustments of the projected headlight beam. This mounting is of advantage, since it prevents vertical displacement of the headlight beam by accidental movement of the lamp casing.

The lamp bulb 12 shown in Fig. 1 has a plurality of vertically spaced filaments 14, each of which has one end connected to a common return which may be ground (the automobile frame) as in the usual manner of "single-contact" lamp bulbs. The other ends of the filaments are connected respectively through wires 15 with an arcuate series of electrical contacts 16 supported in any convenient manner from the frame 17 of the automobile. The connection of the ends of the filaments 14 through the wires 15 with the contacts 16 is such that the end of the lower filament is connected to the upper contact and the end of the upper filament is connected to the lower contact, the other connections being correspondingly arranged. In other words, the contact 16 connected to any one of the filaments 14 is above that contact 16 which is connected to the next lower filament 14.

Pivotally mounted on a horizontal axis on the frame 17 of the automobile is a swinging contact arm 18 carrying at one end a contact finger 19 which co-operates with the series of stationary contacts 16. The arm 18 is mounted near the rear end of the automobile frame, and its other end is connected as by means of the link 21 with some part which moves with the rear axle. Desirably, the connection between the arm 18 and the rear axle has a degree of lost-motion, as would be provided by slotting the arm 21 at its point of connection with the arm 18 as shown at 22. The end contacts of the series of contacts 16 are desirably elongated circumferentially to accommodate over-travel of the contact finger 19.

The contact finger 19 is connected through the usual battery 23 and light-control switch 24 with ground.

The arm 18 is so arranged that the moving contact finger 19 engages one of the uppermost of the contacts 16 when the automobile is not loaded, or is subjected to a relatively light loading. With this condition of loading maintained, the headlamp is adjusted, as through its universal mounting on the support 13, to provide the desired beam pattern on the road surface, and the lamp is then clamped in that position. An increase in the load carried by the automobile causes the rear end of the car frame and body to be depressed more than the front end, thus creating a tendency to raise the projected headlight beam. With my invention, however, the deflection of the rear end of the automobile frame 17 causes the contact arm 18 to swing in a counter-clockwise direction (Fig. 1) to bring the contact finger 19 into engagement with a stationary contact 16 lower than that which is previously engaged. As a result current is cut off from the filament which was previously illuminated and is supplied to a higher filament, thus creating a tendency to depress the projected headlight beam relative to the car frame. This latter depression of the headlight beam relative to the car frame counteracts the movement of the car frame which tends to raise the headlight beam relative to the road surface.

The purpose of the lost motion connection provided by the slot 22 is to eliminate movement of the contact arm 18 when the changes in spring deflection are slight. While all deflections of the spring have an effect upon the pattern of the headlight beam on the road surface, such effect is negligible for slight changes in spring deflection, and there is no necessity for correction. The lost-motion connection between the arm 18 and the link 21 permits these slight spring deflections to occur without changing the vertical disposition of the headlight beam relative to the car frame or intermittent lighting of first one and then another filament.

The lamp bulb shown in Fig. 3 differs from that shown in Figs. 1 and 2 in that its filaments 14 do not have a common return but are connected in series. The extreme ends of the series and one end of each filament are connected respectively to contacts 25 in the base 26 of the lamp bulb, these contacts on the base 26 engaging respectively stationary contacts 27 in the lamp socket. The socket contacts 27 are connected respectively through wires 28 to the contacts 16 which are arranged in an arcuate series as before. This connection is such that the ends of the upper filament 14 are connected respectively to the lowermost contacts 16, the ends of the next lower filament being connected respectively to those contacts 16 which are second and third from the bottom, and so on until the ends of the lower filament 14 are connected respectively to the two upper contacts 16.

If now a suitable source of current is connected across any two adjacent contacts 16 one of the filaments 14 will be illuminated. To control the supply of current to the filaments 14, I may provide the contact arm 18 with two contact fingers 29 insulated from each other and separated circumferentially by a distance corresponding to the spacing of the contacts 16. One of the contacts 29 may be directly connected to ground, and the other contact 29 may be connected through the light-control switch 24 to one side of the battery 23, the other side of which is grounded.

Desirably, the two contact fingers are spaced at different distances from the axis of pivotal mounting of the arm 18, the contacts 16 having sufficient radial extent to engage both contact fingers. The two contacts at each end of the series of contacts 16 are provided with circumferential extensions 16' radially spaced from each other to accomodate over-travel of the arm 18.

In the device shown in Fig. 2, the free end of the arm 18 is connected as indicated in Fig. 1 so that it swings about its axis of pivotal mounting as the vehicle springs are subjected to variations in deflection. Adjustments are made as set forth above, and the device operates in the same manner to counteract the tendency of the headlight beam to be raised when the load carried by the automobile is increased.

If the mounting of the lamp housing 10 is such as to provide no vertical adjustment of the projected light beam, I may make the lamp bulb 12 vertically adjustable in the housing 10. This result can be readily accomplished by supporting the lamp-bulb socket from a bracket 31 which is secured to the inner surface of the casing 10 by means of a bolt 32. The bolt 32 passes through a slot in the lamp bracket 31 and has on its inner end an eccentric head 33 received between flanges 34 on the bracket. By rotating the bolt, the eccentric head causes the lamp bracket 31 to move upwardly or downwardly to vary the vertical position of the lamp bulb 12, this movement of the lamp bulb producing a vertical displacement of the projected beam. When the desired adjustment is obtained, the bracket 31 may be clamped in place by means of a nut 35 if friction is not sufficient to hold it.

It is desirable to provide in association with the arm 18 some form of mechanism which will prevent such arm from occupying a position where current will be simultaneously supplied to two different filaments 14 of the lamp bulb 12. To this end, I may mount on the arm 18 a spring-pressed ball 40 which co-operates with an arcuate member 41 provided with angularly spaced ridges 42. The ridges 42 have inclined sides and are so spaced that the spring-pressed ball 40, co-operating with such inclined sides, will prevent either of the contact fingers 29 from engaging longer than momentarily two adjacent contacts 16. A similar device may be used with the switch mechanism illustrated in Fig. 1. In either case, the operative connection between the arm 18 and the axle of the vehicle should provide sufficient lost-motion to permit the necessary amount of movement of the arm 18 under the influence of the spring-pressed ball 40.

Various arrangements of the filaments 14 of the lamp bulb are possible. Where the filaments are connected in series, as in the case of the construction illustrated in Figs. 2 and 3, the filament supports 45 may be arranged in two vertical rows in staggered relation, with each individual filament extending diagonally from a filament support 45 in one row of a filament support in the other row. Where the connections and the switch mechanism illustrated in Fig. 1 are used, the filaments may be arranged in different ways, some of which are illustrated in Figs. 6, 7, 9, and 10.

In Fig. 6, the filaments 14 are all located in substantially the same vertical plane. The filament-supports 45 of one vertical row of supports are connected together and to a metal sleeve 46 surrounding the base of the lamp bulb, thus connecting one end of each filament to ground. The filament-supports 45 for the other ends of the filaments are connected respectively to contacts 47 in the lamp-bulb base.

If it is desired to support the filaments at a greater distance from each other than is possible with the arrangement shown in Fig. 6, I may separate them by a horizontal interval as well as by vertical spacing. Such an arrangement is shown in Fig. 7, where the filament-supports 45 are shown as progressively increasing in length, with the result that the filaments 14 are disposed in an oblique plane.

If V-shaped filaments disposed in a horizontal plane are desired, they may be arranged as illustrated in Figs. 9 and 10. Here, the filament-supports 45 are all of the same length; but alternate filaments extend forwardly from the ends of their associated supports, while the other filaments extend rearwardly therefrom.

It may be desirable at times to supplement with a manual control the automatic control provided by the switch mechanism operated by spring deflection. In Fig. 11, I have illustrated a means for accomplishing this object in the arrangement of filaments and electric connections shown in Fig. 2. In this modification, the wires 28 are not connected directly to the contacts 16 of the switch mechanism, but instead are connected respectively to a series of fixed contacts 50 of a manually operated control device. There are more of the contacts 16 than there are wires 28, and these contacts 16 of the switch mechanism are connected to a series of movable contacts 51 of the manually operated control device. The contacts 51 are mounted for movement as a unit, as by being mounted on a movable member 52 the position of which is controlled by a hand lever 53. By operating the hand lever 53, the contacts 51 can be moved over the contacts 50 to bring the wires 28 into electrical connection with a different group of consecutive contacts 16.

This manual control can be used to supplement the automatic control when an unusual position of the projected headlight beam is desired or when there is an unusual distribution of the load carried by the vehicle. Thus, if the driver should desire a greatly depressed beam, the contacts 51 could be raised. Similarly if it should be desired to elevate the beam, the contacts 51 could be lowered. Further, in case of breakage of the operative connection between the switch mechanism and the axle or in the event one of the lamp filaments should be burned out, the member 52 could be raised or lowered to effect the desired control.

I have illustrated and described my invention as used in connection with a single headlamp. If two headlamps are used, they may each be provided with one of the multi-filament lamp bulbs, and the filaments of both bulbs may be connected under the joint control of a single switching mechanism. Or, if desired, the lamp bulb of each headlamp may be controlled by its own switching mechanism, the two switching mechanisms being located on opposite sides of the vehicle frame.

This is particularly advantageous, since the spring deflection may be different on the two sides of the vehicle as a result of unsymmetrical load distribution. If one switching mechanism is used to control two headlamps, it is desirable that such switching mechanism be located near the longitudinal center-line of the vehicle in order that it may not be affected by unsymmetrical loading.

I claim as my invention:—

1. In combination with a vehicle having a spring-supported frame, a headlamp carried from said frame, a lamp-bulb for said headlamp, said lamp-bulb having a plurality of vertically spaced filaments, a source of current, and means responsive to spring deflection for selectively controlling the electrical connection of said current-source and said filaments.

2. In combination with a vehicle having a spring-supported frame, a headlamp carried from said frame, a lamp-bulb for said headlamp, said lamp-bulb having a plurality of vertically spaced filaments, a source of current, switch means selectively controlling the electrical connection of said current-source and said filaments, and switch-control means acting between two parts of the vehicle which move relatively to each other when the vehicle springs are deflected.

3. In combination with a vehicle having an axle and a frame spring-supported upon said axle, a headlamp carrier from said frame, a lamp-bulb for said head-lamp, said lamp-bulb having a plurality of vertically spaced filaments, a source of current, and switch means for selectively controlling the connection of said current-source and said filaments, said switch means including a plurality of contacts mounted on the vehicle frame, a contact finger movably mounted on the vehicle frame and adapted to engage any of said contacts, and means for operatively interconnecting said finger and said axle.

4. The invention set forth in claim 3 with the addition that said interconnecting means includes a lost-motion connection.

5. In combination with a vehicle having a spring-supported frame, a headlamp carried from said frame, a plurality of vertically spaced current-consuming light sources for said headlamp, a source of current for said light source, and means responsive to changes in the vertical position of said frame relative to the surface on which the vehicle rests for selectively controlling the electrical connection of said current-source and said light-sources.

6. In combination with a vehicle having an axle and a frame spring-supported upon said axle, a headlamp, a headlamp bulb, said lamp-bulb having a plurality of vertically spaced filaments, a source of current, and switch means for selectively controlling the connection of said current-source and said filaments, said switch means including a plurality of contacts mounted on the vehicle frame, a contact finger movably mounted on the vehicle frame and adapted to engage any of said contacts, means for operatively interconnecting said finger and said axle, said contacts being movable as a unit relatively to said frame, and mechanism for so moving said contacts.

7. In combination with a vehicle having a spring-supported frame, a head-lamp supported from said frame, automatic means responsive to changes in the vertical position of said frame relative to the surface on which the vehicle rests for maintaining the disposition of the head-light beam substantially constant, and manually operated means for modifying the controlling effect of said automatic means.

In witness whereof, I have hereunto set my hand this 19th day of April, A. D. one thousand nine hundred and twenty-nine.

CHESTER S. RICKER.